(12) United States Patent
MacDonald

(10) Patent No.: US 8,017,164 B1
(45) Date of Patent: Sep. 13, 2011

(54) TOMATO PEELING METHOD

(75) Inventor: John MacDonald, Grant, FL (US)

(73) Assignee: Green Products & Technologies, LLC, Melbourne, FL (US)

( * ) Notice: Subject to any disclaimer, the term of this patent is extended or adjusted under 35 U.S.C. 154(b) by 680 days.

(21) Appl. No.: 12/057,771

(22) Filed: Mar. 28, 2008

(51) Int. Cl.
*A23L 1/212* (2006.01)

(52) U.S. Cl. .......................... 426/287; 426/615; 426/483

(58) Field of Classification Search .................. 426/287, 426/615, 483

See application file for complete search history.

(56) References Cited

OTHER PUBLICATIONS

Anon. 2007. 21 CFR 173.315.*

* cited by examiner

*Primary Examiner* — Carolyn Paden
(74) *Attorney, Agent, or Firm* — Jacqueline E. Hartt; GrayRobinson, P.A.

(57) ABSTRACT

A method for peeling fruits and vegetables, particularly those having thin skins, such as tomatoes includes immersing the fruit or vegetable in a boiling solution comprising carbamide and one of carborane and hydrogen chloride to loosen a peel thereof. In a particular embodiment, the carborane comprises trifluoromethanesulfonic acid. The fruit or vegetable is removed from the solution after a predetermined time period. The fruit or vegetable is cooled, and the loosened peel is removed from the fruit or vegetable.

11 Claims, No Drawings

TOMATO PEELING METHOD

FIELD OF INVENTION

The present invention generally relates to methods for peeling fruits and vegetables, and, in particular, to methods for peeling tomatoes.

BACKGROUND

Tomato peels are difficult to remove, being very thin and fragile, and the underlying pulp being soft. Domestically it is known to peel tomatoes by hand with a knife, or by plunging them briefly into boiling water to loosen the skin. On the commercial scale, a method with greater throughput is needed. For such large-scale purposes it is known to use steam, ohmic heating, or lye. Lye, or sodium hydroxide, is a corrosive caustic with an alkaline pH. The lye treatment is known to be followed by an addition of hydrochloric or sulfuric acid as a neutralizing agent.

It would be beneficial to provide a system and method for peeling fruits and vegetables, and tomatoes in particular, that has substantially no environmentally harmful byproducts.

SUMMARY OF THE INVENTION

The present invention is directed to a method for peeling fruits and vegetables, particularly those having thin skins, such as, but not intended to be limited to, tomatoes. One of skill in the art will understand that other fruits and vegetables could be amenable to peeling with the use of the present invention, such as peppers.

In a particular embodiment, the invention is directed to a method for peeling a thin-skinned fruit or vegetable. The method comprises immersing the fruit or vegetable in a boiling solution comprising carbamide and one of hydrogen chloride and carborane to loosen a peel thereof. The fruit or vegetable is removed from the solution after a predetermined time period. The fruit or vegetable is cooled, and the loosened peel is removed from the fruit or vegetable.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read.

DETAILED DESCRIPTION OF THE PREFERRED EMBODIMENT

A description of the preferred embodiments of the present invention will now be presented. A method for peeling a thin-skinned fruit or vegetable such as a tomato comprises synthesizing a peeling solution. The solution is synthesized by adding carbamide to carborane, or carbamide to hydrogen chloride, in a glass-lined reactor at room temperature and mixing. The embodiment believed to represent the best mode at the time of filing is that including the solution containing carborane, most particularly, trifluoromethanesulfonic acid (also known as triflic acid, or TfOH). The reaction is exothermic. Formulations can comprise that which will create a salt of approximately 1:1 to 2:1 ratio. In particular, 35 parts of carbamide can be added to 65-130 parts carborane or hydrogen chloride by weight to create mineral salts of organic amide. The formed solution can then be diluted by adding it to aqueous solution to form a 15-40% solution.

The tomato is immersed in the synthesized solution at a temperature of at least 200° F., and preferably in a range of 200-210° F. to loosen a peel thereof. Agitation and/or pressure can be applied to the tomato or solution. The tomato is removed from the solution after a predetermined time period, for example, approximately 1 min, and cooled, for example, by exposing to cool water. The loosened peel can then be removed from the tomato, such as by hand or other means.

The solution synthesized by the method above can be used for purposed other than fruit and vegetable peeling, for example, any purpose for which hydrochloric acid is currently used. Such uses include, but are not intended to be limited to, concrete removal and dissolving, acidizing (activation) of petroleum wells, boiler scale removal, ore reduction, food processing, pickling and metal cleaning, industrial acidizing, general cleaning, such as of a membrane in desalinization plants, alcohol denaturing, production of vinyl chloride from acetylene and alkyl chlorides from olefins, hydrochlorination, polymerization reactions, isomerization, alkylation, and nitration reactions. This solution can replace traditional acids for solvation, in aqueous cleaning solutions, and in other processing solutions. Materials that can be cleaned include wire, metals, jewelry, printed circuit boards, wood, masonry, mortar, concrete, painted surfaces, plastics, polymeric substances, and the like.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the method illustrated and described herein are by way of example, and the scope of the invention is not limited to the exact details disclosed herein.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A method for peeling a thin-skinned fruit or vegetable comprising:
    immersing the fruit or vegetable in a boiling solution comprising carbamide and hydrogen chloride to loosen a peel thereof, wherein the solution comprises a 15-40% solution of carbamide and hydrogen chloride in a ratio between 1:1.85 to 1:3.7 by weight;
    removing the fruit or vegetable from the solution after a predetermined time period;
    cooling the fruit or vegetable; and
    removing the loosened peel from the fruit or vegetable.

2. The method recited in claim 1, further comprising synthesizing the solution by adding the carbamide to the hydrogen chloride at room temperature and mixing.

3. The method recited in claim 1, wherein the boiling solution has a temperature in a range of 200-210° F.

4. The method recited in claim 1, wherein the predetermined time comprises approximately 1 min.

5. The method recited in claim 1, further comprising introducing at least one of agitation and pressure to the immersed fruit or vegetable.

6. The method recited in claim 1, wherein the cooling step comprises exposing the fruit or vegetable to water cooled to below room temperature.

7. A method for peeling a tomato comprising:
  immersing the tomato in a solution at a temperature of at least 200° F., the solution comprising carbamide and one of carborane and hydrogen chloride to loosen a peel thereof, wherein the solution comprises a 15-40% solution of carbamide and hydrogen chloride in a ratio between 1:1.85 to 1:3.7 by weight;
  removing the tomato from the solution after a predetermined time period;
  cooling the tomato; and
  removing the loosened peel from the tomato.

8. The method recited in claim 7, further comprising synthesizing the solution by adding the carbamide to the hydrogen chloride at room temperature and mixing.

9. The method recited in claim 7, wherein the predetermined time comprises approximately 1 min.

10. The method recited in claim 7, further comprising introducing at least one of agitation and pressure to the immersed tomato.

11. The method recited in claim 7, wherein the cooling step comprises exposing the tomato to water cooled to below room temperature.

* * * * *